United States Patent [19]

Izumida

[11] Patent Number: 4,836,597
[45] Date of Patent: Jun. 6, 1989

[54] FOLDABLE AND DETACHABLE SEAT FOR MOTOR VEHICLE

[75] Inventor: Satoshi Izumida, Kanagawa, Japan

[73] Assignee: Ikeda Bussan Co., Ltd., Ayase, Japan

[21] Appl. No.: 125,007

[22] Filed: Nov. 24, 1987

[30] Foreign Application Priority Data

Nov. 28, 1986 [JP] Japan ................................ 61-283697

[51] Int. Cl.<sup>4</sup> ............................................. B60N 1/00
[52] U.S. Cl. ..................................... 296/63; 248/501
[58] Field of Search ............... 296/63, 65 R; 248/501; 297/440, 452

[56] References Cited

U.S. PATENT DOCUMENTS

| | | | |
|---|---|---|---|
| 3,915,493 | 10/1975 | Brown | 296/63 |
| 4,273,376 | 6/1981 | Duguet et al. | 296/65 R |
| 4,588,225 | 5/1986 | Sakamoto | 296/65 R |
| 4,700,989 | 10/1987 | Ercilla | 296/65 R |

*Primary Examiner*—Robert R. Song
*Attorney, Agent, or Firm*—Foley & Lardner, Schwartz, Jeffery, Schwaab, Mack, Blumenthal & Evans

[57] ABSTRACT

A foldable and detachable seat for a motor vehicle, which has a seat detaching device which comprises a base member secured to a seat cushion and defining at spaced portions thereof first and second cuts which are sized and arranged to mate with respective pins provided on a floor; first and second latching mechanisms mounted to the base member to incorporate with the first and second cuts respectively, the latching mechanisms being capable of latching the spaced portions of the base member with the pins of the floor when the pins are properly put into the first and second cuts; a connecting rod extending between the first and second latching mechanisms to allow synchronous operation of the mechanisms; and an operation handle held by the base member and linked to the connecting rod, so that upon manipulation of the handle, the connecting rod is moved in a given direction to cause the first and second latching mechanisms to assume their pin unlatching positions.

12 Claims, 3 Drawing Sheets

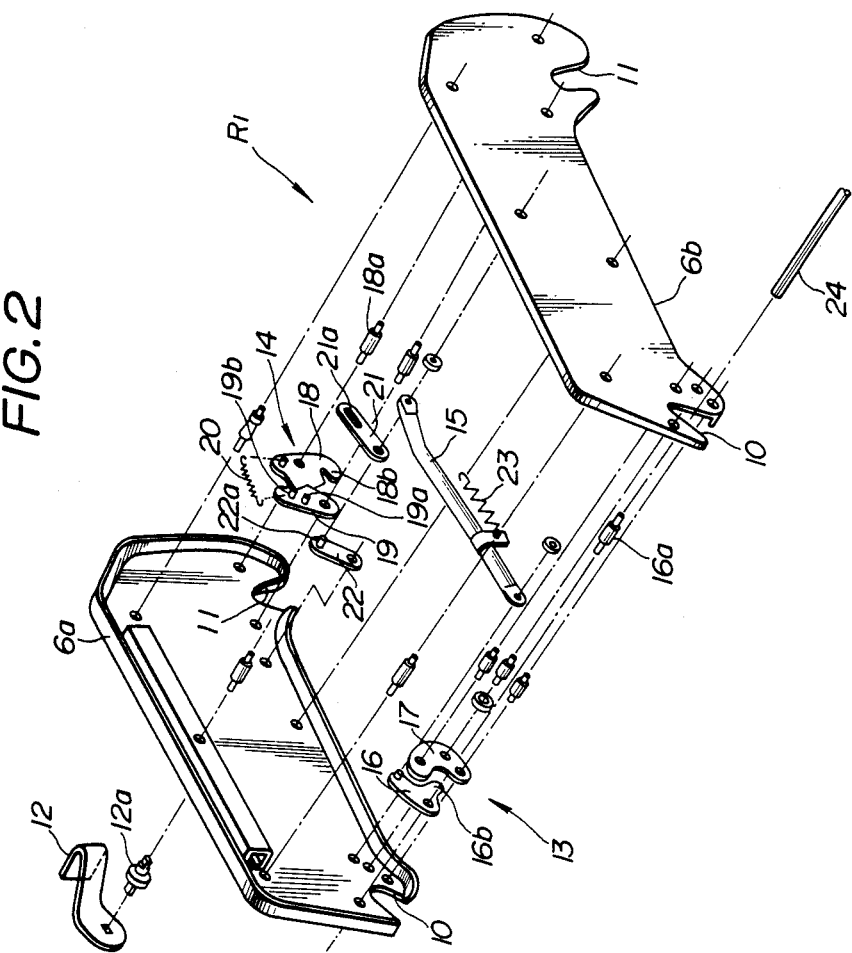

FOLDABLE AND DETACHABLE SEAT FOR MOTOR VEHICLE

BACKGROUND OF THE INVENTION

1. Field of the Invention

The present invention relates in general to seats for automobiles, and more particularly to foldable seats used as a rear seat for automobiles for commercial use, such as a station wagon, van or the like.

2. Description of the Prior Art

In automobiles for commercial use (such as a van, station wagon or the like), a so-called "foldable seat" is usually employed as a rear seat for obtaining enlarged luggage space when a rear part of the vehicle cabin is used as a luggage space. Upon requirement of such a larger luggage space, a seatback of the rear seat is folded forward onto a seat cushion of the same.

Among these foldable seats, there is a type which is equipped with a seat detaching mechanism by which the entire seat is inclined forward with the seatback folded, and as occasion demands, the entire of the seat can be dismantled from the floor of the vehicle. In accordance with this type seat, a much larger luggage space is obtained than the usual foldable seat.

However, due to the construction of such seats some of the foldable and detachable seats of the above-mentioned type require a troublesome manual operation for dismantling and mounting the seat from and onto the floor. Furthermore, some of the conventional seats have a lower side of the seat cushion which, due to its construction, does not provide suitable storage space. Thus, when the seat is in use, the lower space defined below the seat cushion can not be used as an extra luggage space.

SUMMARY OF THE INVENTION

It is therefore an object of the present invention to provide a foldable and detachable seat which is free of the above-mentioned drawbacks.

According to the present invention, there is provided a seat adapted to be detachably mounted on a floor which is formed at spaced portions with first and second pins secured thereto, the seat comprising a seat cushion; a seatback pivotally mounted on the seat cushion; a seat detaching device mounted beneath the seat cushion, the device including; a base member secured to the seat cushion and defining at spaced portions thereof first and second cuts which are sized and arranged to mate with the first and second pins of the floor respectively; first and second latching mechanisms mounted to the base member to incorporate with the first and second cuts respectively, the latching mechanism being capable of latching the spaced portions of the base member with the first and second pins of the floor when the pins are properly put into the first and second cuts; a connecting rod extending between the first and second latching mechanisms to allow synchronous operation of the mechanisms; and an operation handle held by the base member and connected to the connecting rod, so that upon manipulation of the operation handle, the connecting rod is moved in a given direction to cause the first and second latching mechanisms to assume their pin unlatching positions.

BRIEF DESCRIPTION OF THE DRAWINGS

Other objects and advantages of the present invention will become apparent from the following description when taken in conjunction with the accompanying drawings, in which:

FIG. 2 is an exploded view of one of two units which constitute a seat detaching mechanism employed in the seat of the present invention;

DETAILED DESCRIPTION OF THE INVENTION

Figure 1:
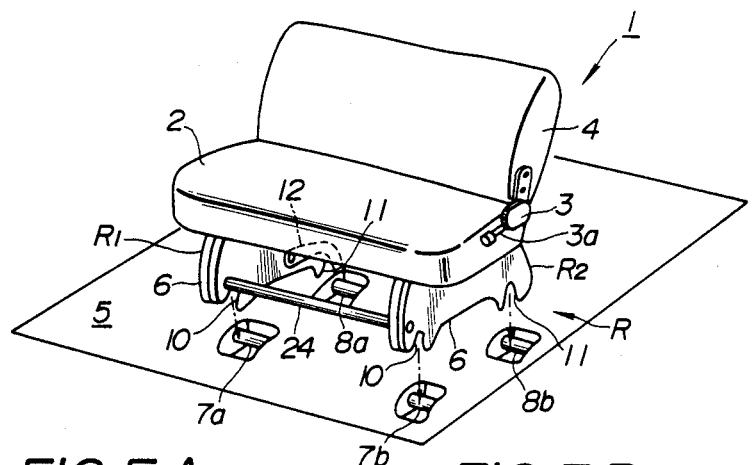
FIG. 1 is a perspective view of a foldable and detachable seat according to the present invention.

Referring to the accompanying drawings, particularly FIG. 1, there is shown a foldable and detachable seat 1 according to the present invention.

Figures 5A, 5B:
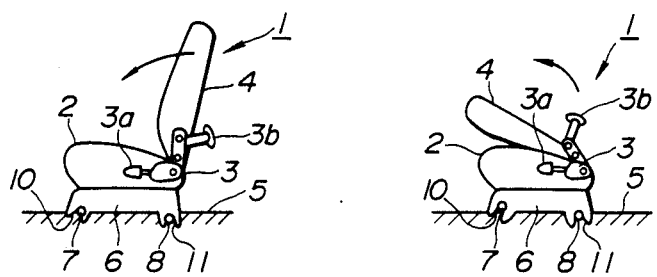
FIGS. 5A, 5B and 5C are side views of the foldable and detachable seat of the present invention, showing in order the steps for dismantling the entire seat from a floor.
Figure 5C:
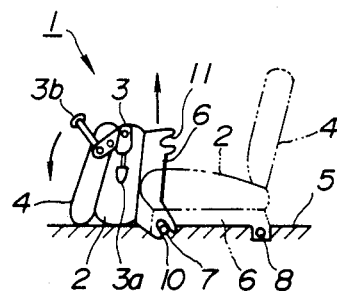

The seat 1 comprises generally a seat cushion 2 mounted on a seat detaching mechanism "R" and a seatback 4 pivotally mounted on a rear part of the seat cushion 2 through a known reclining device 3. The reclining device 3 has a control lever 3a which is manipulated when an angular position adjustment of the seatback 4 relative to the seat cushion 2 is needed. The seat detaching mechanism "R" is detachably mounted on a vehicle floor 5 is a manner as wil be described hereinafter. Designated by numeral 3b in FIGS. 5A to 5C is a hook-equipped belt which is used for fastening the seat to a vehicle body when the same is folded.

The floor 5 is formed with four rectangularly spaced four recesses (no numerals) each having a pin 7a, 8a, 7b or 8b extending thereacross.

As is seen from FIG. 1, the seat detaching mechanism "R" comprises generally two units $R_1$ and $R_2$ which are substantially the same in construction. Thus, for ease, the description will be made with respect to only the left-positioned unit $R_1$ in FIG. 1 as follows.

As is best understood from FIG. 2, the unit $R_1$ comprises a flat housing which includes two mutually mated plates 6a and 6b, each having at its front lower part a front cut 10 and at its rear lower part a rear cut 11. As will be described in detail hereinafter, upon proper mounting of the seat 1 on the floor 5, the cuts 10 and 11 of the housing receive therein the pins 7a and 8a of the floor 5. Each cut 10 and 11 is gradually widened as the distance from the closed end thereof increases for facilitating mating of the cuts 10 and 11 with the associated pins 7a and 8a.

The unit $R_1$ further comprises various parts which are housed in the flat housing, which are front and rear latching mechanisms 13 and 14 and a connecting rod 15. The rod 15 synchronizes operations of the front and rear latching mechansims 13 and 14.

The latching mechanisms 13 and 14 function to latch the unit $R_1$ to the pins 7a and 8a of the floor 5 upon proper mating engagement of the cuts 10 and 11 with the associated pins 7a and 8a. An operation handle 12 is incorporated with the connecting rod 15, so that upon manipulation of the operation handle 12, the rod 15 is moved in a direction to cause the latching mechanisms 13 and 14 to assume their unlatching conditions.

More specifically, the front latching mechanism 13 comprises a lock plate 16 which is pivotally connected through a pivot pin 16a to the housing near the front cut 10. The lock plate 16 has a latching pawl 16b formed thereon, which pawl 16b, when the lock plate 16 is pivoted by a given degree in a counterclockwise direction in FIG. 2, is exposed to the front cut 10 to achieve latching engagement with the pin 7a of the floor 5. The lock plate 16 further has a leading end to which an end of the afore-mentioned connecting rod 15 is pivotally connected. Designated by numeral 17 is a bracket or reinforcement attached to a peripheral portion of the front cut 10 to reinforce the same.

The rear latching mechanism 14 comprises a lock plate 18 which is pivotally connected through a pivot pin 18a to the housing near the rear cut 11. The lock plate 18 has latching pawl 18b formed thereon, which pawl 18b, when the lock plate 18 is pivoted by a given degree in a clockwise direction in FIG. 2, is exposed to the rear cut 11 to achieve latching engagement with the pin 8a of the floor 5. Near the lock plate 18, there is pivotally connected a holding lever 19 which has an engaging portion 19a which is selectively engageable with the lock plate 18. A spring 20 is expanded between respective upper portions of the lock plate 18 and the holding lever 19 to bias these members clockwise and counterclockwise respectively in FIG. 2. As will be clarified hereinafter, the latching operation of the lock plate 18 is controlled by the holding lever 19 in cooperation with the spring 20. The holding lever 19 is provided with a pin 19a which is slidably received in an elongate slot 21a formed in a connecting lever 21 which is, in turn, pivotally connected to the other end of the connecting rod 15. More specifically, the pivotal connection between the connecting lever 21 and the connecting rod 15 is made through a pin 22a which is formed on a link lever 22.

The link lever 22 is connected to a shaft 12a of the afore-mentioned operation handle 12 to rotate therewith. Designated by numeral 23 is a spring which biases the connecting rod 15 in a direction to achieve the latching conditions of the latching mechanisms 13 and 14.

As has been described hereinafter, the other unit $R_2$ arranged beside the above-mentioned unit $R_1$ has substantially the same construction and function as the unit $R_1$.

An elongate synchronizing rod 24 extends across the two units $R_1$ and $R_2$, which has axially opposite ends secured to the pivoted portions of the respective lock plates 16 and 16 of these two units $R_1$ and $R_2$.

In the following, operation of the foldable and detachable seat 1 of the invention will be described with reference to the drawings.

For ease of understanding, the description will be commenced with respect to an in-use condition of the seat 1 as shown in FIG. 5A and directed to only the operation of the unit $R_1$ because of the substantially same construction of the other unit $R_2$.

Figure 3:
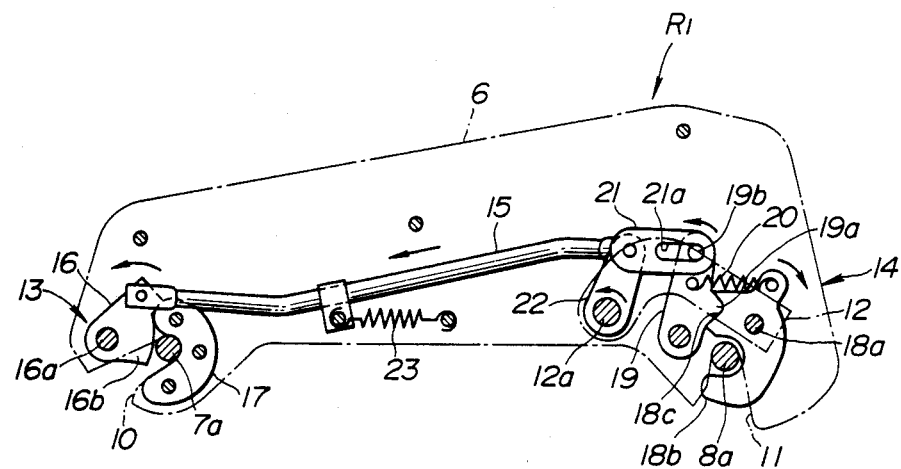
FIG. 3 is a side view of the unit, with several parts removed for clarification of the drawings.

In this in-use condition, the seatback 4 is locked at a certain raised position relative to the seat cushion 2, and the unit $R_1$ (also $R_2$) of the seat detaching mechanism "R" is latched to the pins 7a and 8a (and, 7b and 8b) of the vehicle floor 5 assuming such a condition as shown in FIG. 3. As is seen from this drawing, under this condition, the engaging portion 19a of the holding lever 19 is received in a recess 18c of the lock plate 18, and the pin 19b of the same is in contact with a right end of the elongate slot 21a of the connecting lever 21.

Figure 4:
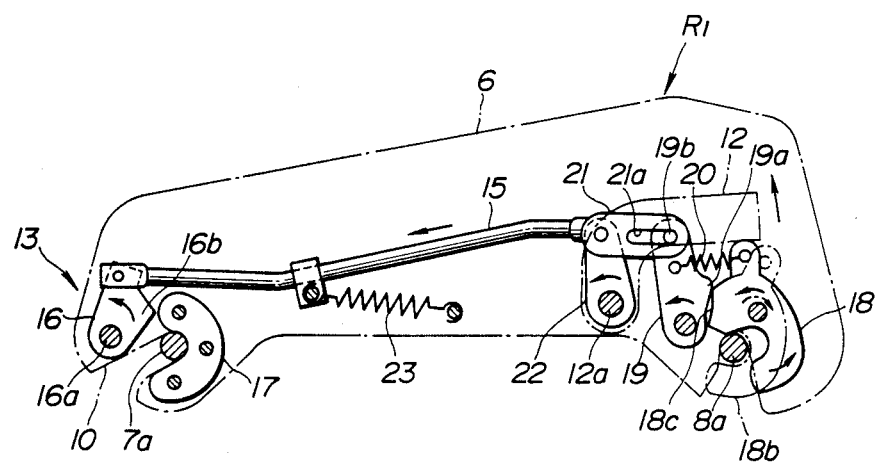
FIG. 4 is a view similar to FIG. 3, but showing a condition different from that of FIG. 3.

Upon folding the seat 1, the control lever 3a (see FIG. 1) of the reclining device 3 is manipulated for pivoting the seatback 4 forward to its foremost folded position, as shown in FIG. 5B. Then, the operation handle 12 of the seat detaching mechanism "R" is turned in a counterclockwise direction in FIG. 2. The link lever 22 is turned counterclockwise in FIG. 3 moving the connecting rod 15 leftward against the biasing force of the spring 23. Thus, as is shown in FIG. 4, the lock plate 16 of the front latching mechanism 13 is turned counterclockwise to its inoperative position releasing the pin 7a, and at the same time, the holding lever 19 of the rear latching mechanism 14 is turned counterclockwise causing the lock plate 18 thereof to turn to its inoperative position releasing the pin 8a. That is, due to the counterclockwise rotation of the holding lever 19 to which the spring 20 is connected, the lock plate 18 is pulled leftward by the spring 20 to its inoperative position. During this counterclockwise turning of the holding lever 19, the engaging portion 19a of the same is slipped out of the recess 18c of the lock plate 18 and put on an upper projection (no numeral) formed at an upper part of the recess 18c. The unit $R_1$ (and the other unit $R_2$) thus becomes unlatched from the pins 7a and 8a of the floor 5. When, under this condition, the operation handle 12 is pulled upward with a certain force, the entire seat 1 is pivoted forward about a common axis of the pins 7a and 7b (see FIG. 1) with the seatback 4 folded. Upon the seat 1 being pivoted to its fully folded position as shown in FIG. 5C, the operation handle 12 is released from the operator's hand. The connecting rod 15 is moved rightward in FIG. 4 to its original position due to the work of the spring 23 causing the lock plate 16 of the front latching mechanism 13 to turn to its pin latching position. However, due to a so-called "lost-motion connection" between the connecting lever 21 and the holding lever 19, and the hooked engagement between the lock plate 18 and the holding plate 19, the return movement of the connecting rod 15 does not induce a clockwise turning of the holding lever 19, thereby holding the latch plate 18 at its unlatching position. Thus, when the seat 1 is in its fully folded position as shown in FIG. 5C, the front latching mechanism 13 latches the pin 7a but the rear latching mechanism 14 assumes its unlatching position wherein the engaging portion 19a of the holding lever 19 is put on the upper projection of the lock plate 18 and the pin 19b of the holding lever 19 is in contact with a left end of the elongate slot 21a of the connecting lever 21.

When dismantling of the seat 1 is needed, the seat 1 is pulled upward with the operation handle 12 being manipulated. Due to manipulation of the handle 12, the front latch mechanism 13 is turned to its inoperative or unlatching condition. Due to the lost motion connection between the connecting lever 21 and the holding lever 19, the manipulation of the operation handle 12 has no affect on the rear latching mechanism 14 thereby keeping the same at its unlatching condition. Thus, the folded seat 1 can be dismantled from the floor. When the seat 1 is kept dismantled, the front latching mechanism 13 assumes its latching position and the rear latching mechanism 14 assumes its unlatching position.

When mounting of the seat 1 on the floor 5 is needed, the seat 1 is put on a right position of the floor 5 having the front and rear cuts 10 and 11 of the unit $R_1$ (also $R_2$) placed on the pins 7a and 8a (and, 7b and 8b). The front pin 7a is inserted into the cut 10 pushing the lock plate 16 away against the force of the spring 23 and the rear pin 8a is inserted into the rear cut 11 and abuts a lower projection (no numeral) formed at a lower portion of the recess 18c. When the pins 7a and 8a are seated in their associated cuts 10 and 11, the lock plate 16 of the front latching mechanism 13 is turned to its latching position due to the force of the spring 23 and the lock plate 18 of the rear latching mechanism 14 is turned to its latching position bringing the recess 18c thereof into engagement with the engaging portion 19a of the holding lever 19, as is seen in FIG. 3. Thus, the unit $R_1$ (and thus the other unit $R_2$) of the seat detaching mechanism R is latched to the floor 5. Thereafter, the seatback 4 is raised to a desired angular position by manipulating the control lever 3a of the reclining mechanism 3.

As will be understood from the foregoing description, in the present invention, dismantling of the seat 1 from the vehicle floor 5 and mounting of the seat 1 onto the floor 5 can be readily carried out by only manipulating the operation handle 12. Furthermore, since, in the seat 1 of the invention, only the synchronizing rod 24 is exposed to the lower space of the seat 1, the space can be used as an extra luggage space.

What is claimed is:

1. A seat adapted to be detachably mounted on a floor, having first and second spaced apart recesses formed therein, said seat comprising:
    first and second spaced apart pins, one of said pins being in each of said recesses;
    a seat cushion;
    a seatback pivotally mounted on said seat cushion;
    a first seat detaching device mounted beneath the seat cushion, said device including;
    a base member secured to said seat cushion and defining at spaced portions thereof first and second cuts each of which is correspondingly sized and arranged to mate with the first and second pins respectively;
    first and second latching mechanisms mounted on said base member to cooperate with said first and second cuts respectively, said latching mechanisms being capable of latching the spaced portions of said base member with said first and second pins when the pins are properly put into said first and second cuts;
    a connecting rod extending between said first and second latching mechanisms to allow synchronous operation of the mechanisms; and
    an operation handle held by said base member and connected to said connecting rod, so that upon manipulation of the operation handle, said connecting rod is moved in a given direction to cause said first and second latching mechanisms to assume their pin unlatching positions.

2. A seat as claimed in claim 1, further comprising: a second seat detaching device which has substantially the same construction as said first seat detaching device, these two detaching devices being spaced from each other and connected through a synchronizing rod for achieving synchronous operation of them.

3. A seat as claimed in claim 2, in which said synchronizing rod has axially opposed ends which cooperate with the respective first latching mechanisms of the two seat detaching devices.

4. A seat as claimed in claim 3, in which said synchronizing rod extends across a longitudinal axis of said seat cushion.

5. A seat as claimed in claim 1, in which said first latching mechanism comprises:
    a lock plate pivotally connected to said base member near said first cut, said lock plate having a latching pawl which is exposed to said first cut when the lock plate is pivoted by a given degree in a given direction; and
    biasing means for biasing said lock plate in said given direction.

6. A seat as claimed in claim 5, further comprising:
    a reinforcing plate which is attached to a peripheral portion of said first cut to reinforce the same.

7. A seat as claimed in claim 6, in which said lock plate has a portion to which an end of said connecting rod is pivotally connected.

8. A seat as claimed in claim 7, in which said biasing means is a spring which is connected to said connecting rod.

9. A seat as claimed in claim 7, in which said second latching mechanism comprises:
    a lock plate pivotally connected to said base member near said second cut, said lock plate having a latching pawl which is exposed to said second cut when said lock plate is pivoted by a given degree in a given direction;
    a holding lever pivotally connected to said base member, said holding lever having an engaging portion which is selectively engageable with said lock plate;
    a spring expanded between said lock plate and said holding lever to bias them in opposite directions; and
    a connecting lever having at its one end portion an elongate slot into which a pin formed on said holding lever is slidably recieved, the other end of said connecting lever being pivotally connected to the other end of said connecting rod.

10. A seat as claimed in claim 9, further comprising:
    a link lever which is interposed between said connecting rod and said operation handle to transmit movements of said operation handle to said connecting lever.

11. A seat as claimed in claim 10, in which said lock plate of said second latching mechanism is formed with a recess with which said engaging portion of said holding lever is slidably engageable.

12. A seat as claimed in calim 1, further comprising:
    a reclining device which is mounted to said seat cushion to adjust an angular position of the seatback relative to said seat cushion.

* * * * *